(12) United States Patent
Ohlmann et al.

(10) Patent No.: US 9,550,571 B1
(45) Date of Patent: *Jan. 24, 2017

(54) OVERHEAD ACCOMMODATIONS FOR AIRCRAFT

(71) Applicant: The Boeing Company, Chicago, IL (US)

(72) Inventors: Kim G. Ohlmann, Lake Forest Park, WA (US); Gregory J. Oakes, Duvall, WA (US); Anthony A. Harrington, Everett, WA (US); Michael J. Olliges, Bothell, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/317,619

(22) Filed: Jun. 27, 2014

Related U.S. Application Data

(63) Continuation of application No. 12/753,482, filed on Apr. 2, 2010, now Pat. No. 8,794,569.

(51) Int. Cl.
*B64D 11/00* (2006.01)

(52) U.S. Cl.
CPC ....... *B64D 11/00* (2013.01); *B64D 2011/0069* (2013.01)

(58) Field of Classification Search
CPC .. B64D 11/00; B64D 11/06; B64D 2011/0069
USPC ....... 105/344, 345, 340, 314–316, 323, 326; 244/118.5, 118.6
See application file for complete search history.

(56) References Cited

U.S. PATENT DOCUMENTS

| | | | | | |
|---|---|---|---|---|---|
| 4,066,227 A | * | 1/1978 | Buchsel | ............... | B64D 11/00 105/340 |
| 5,474,260 A | * | 12/1995 | Schwertfeger | ......... | B64D 11/00 244/118.5 |
| 5,992,797 A | * | 11/1999 | Seidel | ...................... | B64C 1/00 244/118.5 |
| 6,003,813 A | * | 12/1999 | Wentland | ............... | B64D 11/00 244/118.5 |
| 6,073,883 A | * | 6/2000 | Ohlmann | ............... | B64D 11/00 105/316 |
| 6,152,400 A | * | 11/2000 | Sankrithi | ............... | B64D 11/00 105/315 |
| 8,794,569 B1 | * | 8/2014 | Ohlmann | ............... | B64D 11/00 244/118.6 |

\* cited by examiner

*Primary Examiner* — Tien Dinh
*Assistant Examiner* — Michael A Fabula
(74) *Attorney, Agent, or Firm* — Baldauff IP, LLC; Michael J. Baldauff, Jr.

(57) ABSTRACT

An accessible storage, rest, or work accommodation for an aircraft having a passenger cabin with a ceiling and a crown space above the ceiling, comprising: (a) a compartment in the crown space having at least one bunk; (b) an aperture in the passenger cabin ceiling, connecting the compartment to the passenger cabin; (c) a landing positioned below a floor of the compartment, below at least a portion of the aperture, inside the passenger cabin module; and (d) stairs or a ladder leading from the landing to a floor of the passenger cabin.

12 Claims, 9 Drawing Sheets

US 9,550,571 B1

OVERHEAD ACCOMMODATIONS FOR AIRCRAFT

CROSS-REFERENCE TO RELATED APPLICATIONS

This application is a continuation of co-pending U.S. patent application Ser. No. 12/753,482, filed on Apr. 2, 2010, which is a continuation of U.S. patent application Ser. No. 09/457,783, filed on Dec. 9, 1999, now abandoned, which claims the benefit of U.S. Provisional Application Ser. No. 60/112,303, each of which are hereby incorporated by reference in its entirety.

TECHNICAL FIELD

The present invention relates to accommodations for sleeping compartments, changing spaces and crew work areas, storage, and other rear accommodations for commercial passenger aircraft, particularly for use by flight attendants and pilots during long non-stop flights.

BACKGROUND

Modern commercial aircraft are designed to utilize the maximum available cabin space allocation to useable passenger payload capacity. Amenities for passengers are taken into consideration in the accommodation of the passengers. Such accommodations in the main cabin command a premium fare with regard to the space allocated and not available for passenger seating. The passenger aircraft fuselage containing the passenger main cabin is circular or ovoid in cross-section. The main cabin floor is typically located below the geometric center of the cross-section, allowing for the provision of a large passenger compartment. This arrangement provides for a ceiling, overhead stowage compartments and other amenities to serve the needs for the passengers and the passenger compartments. To maximize the passenger utilization and to optimize the revenue generated by the maximization of passenger seating capacity while providing a larger, attractive passenger cabin with appeal and comfort to the passengers, only those encumbrances directly attributable to the passengers benefit are provided, such as galleys, lavatories, closets and facilities directly related to these types of units.

The space above the overhead stowage compartments and ceiling includes ducts, cables, electrical and electronics equipment and other components. In general, the available space above the ceiling and overhead stowage compartments is significantly smaller than the passenger cabin itself. The space below the cabin floor is typically allocated for providing compartments essential for the aircraft operation, such as electrical equipment bays, water supply and wastewater stowage, in addition to cargo compartments for passenger baggage and revenue cargo. This below floor space usually is confined to the remainder of the cross-section available and is typically smaller in height and width than the main passenger cabin.

Long range, subsonic airliners are utilized on routes that are non-stop for duration of twelve hours or longer. For such a flight, federal regulations require the provision of pilot rest accommodations. For these same long duration flights, attendant rests are typically provided as well. A case in point is the Boeing 747™ airliner in which a small attendant rest accommodation is provided. This specific crew rest accommodation is positioned behind the passenger seating in the upper deck of a dual passenger seating deck aircraft. In another instance, for long distance flights the use of dedicated seats for pilots or other crew and changing spaces for the same is provided on the main deck. Additional use of space for specialized functions, including the cabin crew purser, is provided to serve passengers, which requires the allocation of workspaces on the main deck as well.

SUMMARY

In one aspect, this invention is an accessible storage, rest, or work accommodation for an aircraft having a passenger cabin with a ceiling and a crown space above the ceiling, comprising:

(a) a compartment in the crown space having at least one bunk;

(b) an aperture in the passenger cabin ceiling, connecting the compartment to the passenger cabin;

(c) a landing positioned below a floor of the compartment, below at least a portion of the aperture, inside the passenger cabin; and (d) stairs or a ladder leading from the landing to a floor of the passenger cabin.

It has been discovered that the rest accommodation of the invention does not interfere with or encumber the headroom space of the passenger cabin or floor space of passenger cabin main aisles, or require the use of passenger cabin space that would otherwise be used for passenger seating. This invention is particularly useful as a means to provide a rest accommodation in an aircraft that otherwise has less than four feet of vertical space between the fuselage crown and the main cabin ceiling such as some configurations of a Boeing 777™ passenger airplane or the aft portion of a Boeing 747™ passenger airplane which have a generally round-shaped fuselage and a relatively high ceiling in the passenger cabin. The proposed invention also preferably provides a functional work space having an internal chamber within an interior module to serve as a vestibule for a seating area, changing space and other functions including such usage's as a purser work station. These and other advantages of the invention will be apparent from the description that follows.

BRIEF DESCRIPTION OF THE SEVERAL VIEWS OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 shows one bunk unit (the unit closest to the viewer) broken away to reveal additional details of the aircraft overhead rest accommodation; FIG. 2 corresponds to FIG. 1 but with the near bunk unit illustrated; and FIG. 3 shows the overhead rest accommodation from a different angle, closer to a top plan view.

DETAILED DESCRIPTION

Figure 1:
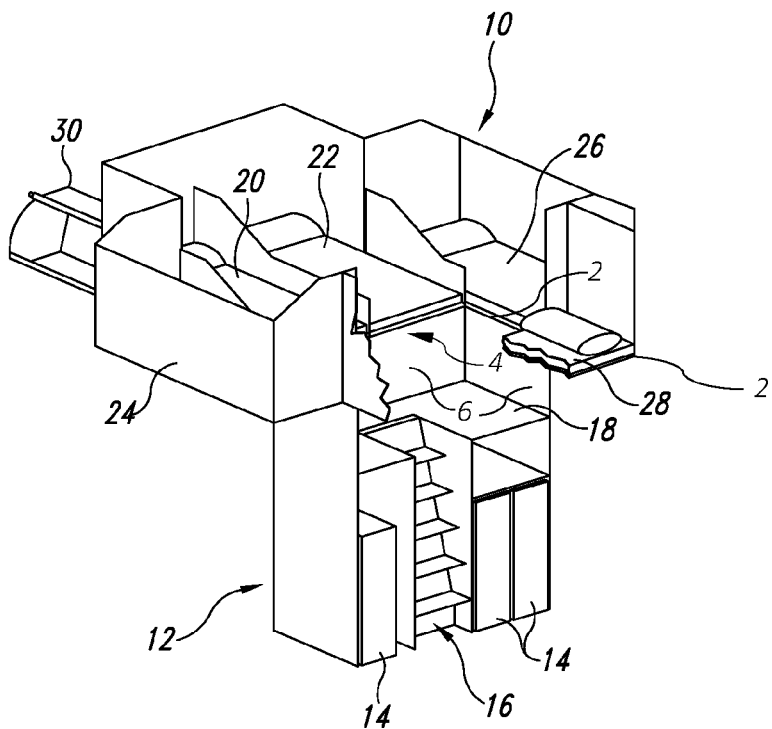
FIG. 1, FIG. 2, and FIG. 3 are diagrammatic top perspectives of an overhead rest accommodation for aircraft in accordance with the present invention.

The present invention provides an accessible compartment in the area above the passenger cabin ceiling and below the fuselage crown of an aircraft, such as a long range, subsonic passenger airliner, above the passenger cabin. "Crown space" as used herein, means the space in the aircraft fuselage above the ceiling of the passenger cabin. The preferred embodiment is the installation of a rest and/or work area in a widebody, twin aisle aircraft having port, center and starboard seat groups, with the rest and/or work area positioned in the crown space of an aircraft above the ceiling of the center seat group of a twin aisle passenger cabin. The area uses a portion of the internal space within the boundary of an interior module as a landing for access to the compartment above the passenger cabin. The landing is positioned below the floor of the overhead compartment and below the ceiling of the passenger cabin, and increases the amount of headroom available to a person requiring access to the compartment. The preferred arrangement for this interior module that provides access to a compartment in the crown area of an aircraft, is in proximity to the passenger exit door cross aisle to readily use the side to side aisleway to gain access to the overhead rest accommodation ladder or stairway. The embodiment of this design will utilize the interior space of an interior module or module that spans only the center seat group from side to side, without impinging on the revenue generating passenger seating area. In another embodiment, if an interior module is positioned in the longitudinal direction, as in the Boeing 747™ Longitudinal Galley, the landing and stairs or ladder may be configured so that they also take up a greater proportion of space in a longitudinal direction, inside the module. The compartment preferably surrounds the aperture so that all seating and beds in the rest accommodation are no more than a few steps away from it. In one embodiment, a person accessing the rest and/or work area does not have to walk in a stooped position very far from the landing, or crawl, to reach a seat or bed. The landing thereby provides a place to stand upright or stoop and gain access to bunks or seats directly adjacent to the aperture. The landing leads directly to the bunks abutting the periphery of the upper region of the interior module or module. The crew member or other person utilizing the rest accommodation is provided more headroom while standing on the landing than would otherwise be available if no landing was provided. The landing is preferably positioned low enough so that the headroom of the space directly above the landing is increased from four feet, or less, to greater than five feet, more preferably at least six feet, and most preferably at least six feet, five inches. The landing is also preferably positioned high enough so that the step from the landing to the floor of the compartment is not so high to be too physically challenging, or else one or more additional steps are provided between the landing and the compartment. It is also preferably positioned low enough so that height of the space above the landing is at least fifty-four inches, more preferably at least sixty inches, and most preferably at least seventy-nine inches for a landing space of at least thirty-eight inches by forty inches area. Preferably, the landing is no more than thirty-six inches below the threshold leading to the bunks or the top of the bunk cushions of the rest and/or work area.

The landing area is preferably large enough so that that person(s) accessing the rest compartment may safely turn around and/or pass by each other while standing on the landing without too much difficulty. The area of the landing is preferably at least 6 square feet, more preferably at least 12 square feet and most preferably at least 15 square feet. This invention is particularly useful in aircraft wherein the crown space has a height of no more than four feet, and in some cases no more than 40 inches. The aperture between the crown space and passenger cabin may be of any suitable size to serve a passageway between the two areas. It should preferably be large enough and positioned such that an adult may climb the ladder or stairs to reach the landing without having to stoop considerably, crawl, or bump against the edge of the aperture. The aperture and landing are preferably large enough to allow two individuals to pass by each other. The aperture has a minimum width or diameter of at least 28 inches, more preferably at least 30 inches, and most preferably at least forty inches. The term "minimum width or diameter" as used herein means the shortest distance across the center of the aperture. If the aperture is rectangular-shaped, its dimensions are preferably at least thirty-six inches by forty inches, more preferably at least thirty-eight inches by sixty inches; but preferably no greater than forty inches by eighty-two inches, more preferably no greater than thirty-six inches by eighty inches.

The utilization of the interior module with a landing and stairway is, consistent with the use of the same main cabin floor area for the passenger amenities such as lavatories, galleys, closets and other amenities dedicated to servicing the main passenger cabin. The proposed invention is readily substituted for the usual interior modules installed in these areas around the main passenger floor passenger exit door cross aisles while not dividing the main passenger cabin longitudinally. In so doing, the module with its internal landing and stairway retains space available below the level of the landing surface for uses such as stowage, reduced height closet space or a reduced height galley whilst offering a changing space and crew working space above the landing surface.

The ceiling height and/or overhead stowage bin space in the passenger cabin within the periphery of the overhead compartment may be reduced to accommodate the crew in the overhead compartment relative to the conventional design. This is provided without significant disruption to the moving or seating of passengers on the main cabin floor.

In another embodiment the landing provides a small chamber, or vestibule, wherein the internal space may serve as a changing area and a secondary, intermediate deck serves as a base for seats and the entry to the bunks directly behind the seat backs. This landing preferably provides sufficient width and breadth to allow two person(s) to pass by each other and efficiently utilize the seat(s), or to access the bunks behind the seats, or to utilize any amenities provided inside the compartment, such as a sink area. Emergency equipment and passenger amenities, such as ventilation outlets, reading-lights, or attendant call buttons, may be provided to the passengers that are directly below the overhead compartment.

The stairway or ladder may be oriented aft or forward or the landing or aperture, depending on the orientation of the passenger cabin module, either aft or forward of the passenger cross aisle. Positioning a stairway module within a passenger seating row can be achieved with the required physical barriers, set backs and space requirements to allow seating to be directly adjacent to an interior module.

In another configuration, an interior module with internal landing and stairway may embody a set of bunks replacing part of the overhead stowage bins in the passenger cabin and not affect the ceiling in the area of the overhead compartment. This arrangement substitutes the compartment for a portion of the overhead stowage bins while utilizing the same method of transiting from stairway and landing to access the bunks and/or seats. Adequate headroom may be provided by adapting the height of the landing to address height requirements. In addition, the height of the compartment may be selected to accommodate headroom requirements. Both alternatives may be considered to accommodate headroom requirements. An additional alternative is shown in an embodiment wherein the rest accommodation bunk compartment to a clear height from bunk cushion top to bunk compartment ceiling is further reduced such that the stowage bins directly below the bunks are retained. The resulting bunk compartment headroom is preferably not less than twenty-two inches, more preferably thirty-four and one half inches.

Use of this invention in many cases will require aircraft components normally located in the central portion of the crown occupied by the proposed rest accommodation to be relocated to a position outboard of the compartment. If the compartment is relatively small, the rest accommodation is preferably located at a position in the aircraft crown where the space is more readily reconfigured than other locations in the crown where the repositioning of components such as air ducts or electrical equipment may require substantial engineering and adjustments to the process for manufacturing the aircraft. The locations in the crown that are more readily reconfigured are typically those above large modules such as galleys. If the use of the invention is desired on an aircraft that has already been built, locating the compartment in such a location is highly preferred for such an aftermarket or "retrofit" installation of a compartment. Preferably, the compartment occupies locations typical for interior modules without substantial affect on the number of seats in the main cabin and, therefore, without affecting the revenue generating capability of the seating configuration.

Referring now to the figures, FIG. 1 shows one embodiment of an overhead rest accommodation 10 in accordance with the present invention using part of the space of a galley module 12 of an aircraft, such as a Boeing 777™. The galley module includes the usual areas for serving carts 14. In the illustrated embodiment, space for two of the carts has been replaced with a steep stairway or ladder 16 leading to a landing 18. In the illustrated embodiment the height of the landing is about three to five feet above the floor of the passenger cabin of the aircraft, and the landing is wholly encompassed by the main deck amenities module, (note galley module 12). Thus, the stairway/ladder and landing affect cabin area minimally, and solely within a module, so that revenue generating passenger seating is not affected at all.

Figure 2:
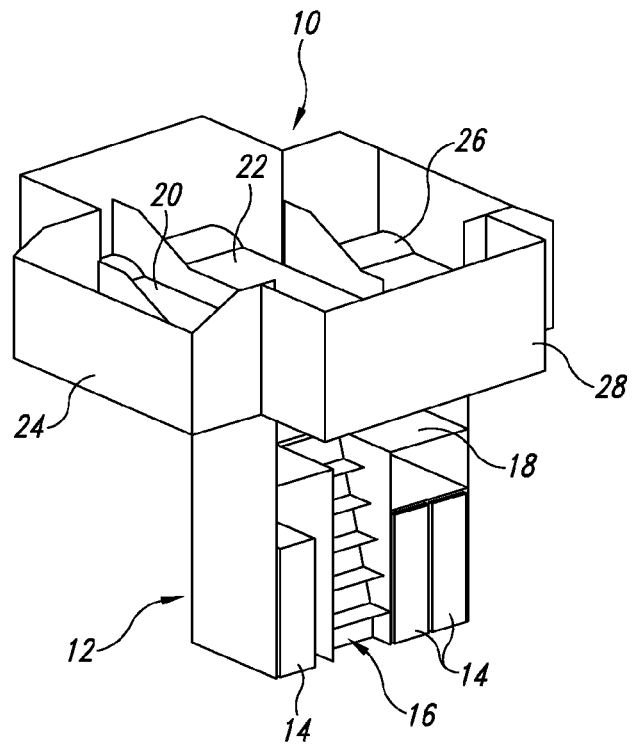
Figure 3:
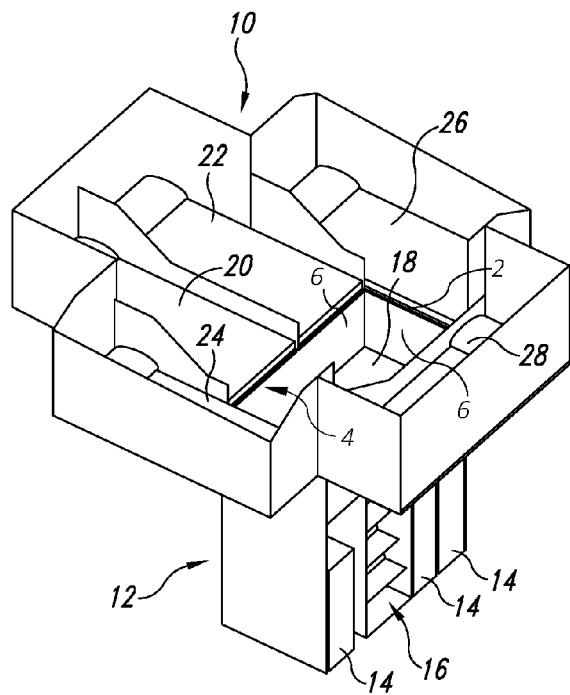

A plurality of bunks 20, 22, 24, 26 and 28 are raised above via walls 6 on a compartment floor 2 and accessible from the landing 18. In the embodiment of FIGS. 1-3, bunks 20 and 22 extend forward from the aperture 4 of the interior module into the area normally occupied by overhead stowage bins 30. Side bunks 24 are offset rearward from the forward bunks and extend over passenger aisleways. A rear bunk 28 is positioned transversely across the aircraft, aft of the landing area 18. All bunks are shown at the same level.

Figure 4:
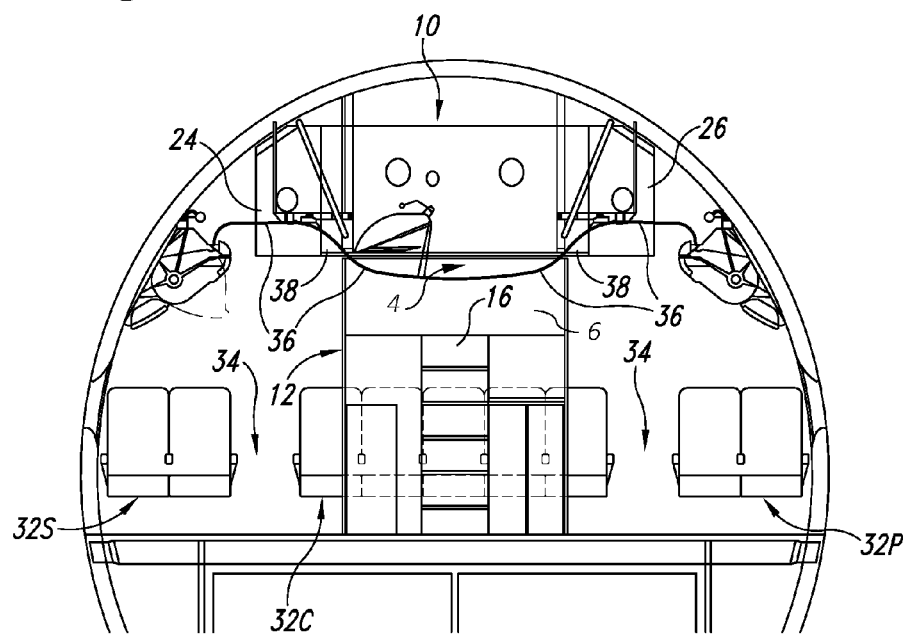
FIG. 4 is a diagrammatic transverse section of an aircraft having an overhead rest accommodation in accordance with FIGS. 1-3.

Since the landing area 18 is lowered relative to the bunks, the user has increased headroom sufficient to stand on the landing 18 for entry into a desired bunk. Within the confines of each bunk itself, less headroom is required. Thus, the arrangement is space efficient even above the passenger cabin ceiling, with the possibility of a separate ceiling for the bunk unit 10 and room above the second ceiling for structural members and, possibly, routing of cables or ducts. FIG. 4 is a diagrammatic representation of a transverse cross-section of the upper portion of the aircraft. It will be noted that the aircraft includes a port seat group 32P, center seat group 32C and starboard seat group 32S. Twin aisles 34 are provided between the outboard seat groups and the center seat group. It is preferred that the aircraft overhead rest accommodation in accordance with the present invention be centered transversely in the aircraft, where there is the maximum headroom. Thus, the stairway or ladder 16 is incorporated in a centerline module such as the five-cart galley 12 which is reduced to three carts, with additional stowage space occupying the remaining space behind said ladder, for the purposes of the present invention. Line 36 shows the normal contour of the underside of the ceiling and overhead bin structure of the passenger cabin. Bunks 20 and 22 (FIGS. 1-3) require no alteration to the ceiling contour because they fit within the confines of the overhead stowage bin area, but these bunks require removal of a few of the overhead bins. The side bunks 24 and 26 may necessitate some lowering of the ceiling if they are to remain at the same level as bunks 20 and 22. Possibly these bunks could be raised and have lesser headroom than the other bunks, in which case a step would be provided for access from the landing 18. The transversely extending aft bunk 28 may require a slight alteration of the ceiling contour at the ends 38.

Overall, the inclusion of the overhead rest accommodation preferably does not require extensive alteration of the interior of the passenger cabin and aircraft structure, and may be retrofitted into existing aircraft, which is one of the major advantages of using existing module areas, a lowered landing, and bunks at a relatively low level, and all bunks accessible from the same landing without aisleways or other ingress or egress areas that would affect the cabin layout.

Figure 5:
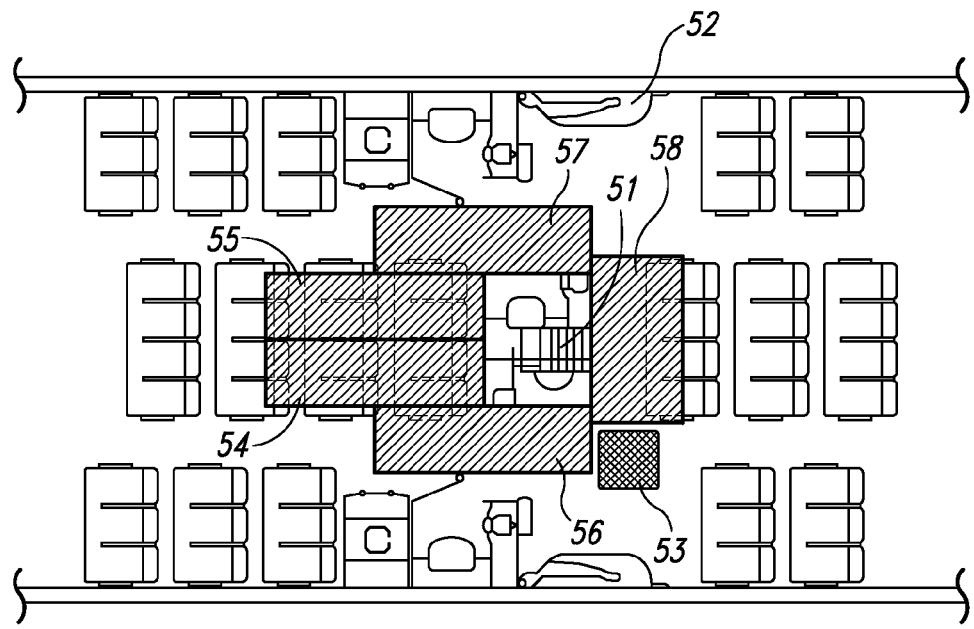
FIG. 5 is a diagrammatic top plan view of an aircraft having an overhead rest accommodation in accordance with the present invention, with the crown and overhead stowage bins of the aircraft removed to illustrate the locations of the bunk units of the overhead rest accommodation.

FIG. 5 shows the layout of one embodiment of a rest accommodation above the passenger cabin. The aircraft corresponds to a representative cabin layout for a Boeing 777™. It will again be noted that no passenger seating areas are affected. Access to the stairway 51 is from the cross aisle between the emergency exit doors 52. An emergency escape hatch (53) is positioned in the passenger exit door egress. A landing at the top of the stairway provides access to bunks 54, 55, 56, 57, and 58. Although the layout is illustrated with the centerline bunks 54 and 55 extending forward, it should be recognized that the reverse arrangement could be provided with the center line bunks extending aft.

Figure 6:
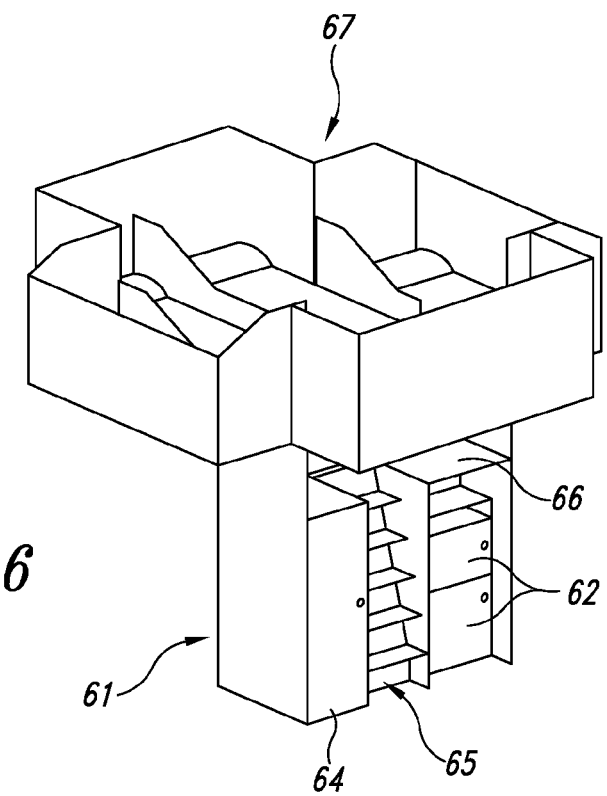
FIG. 6 is a diagrammatic perspective of an overhead rest accommodation of the general type shown in FIGS. 1-5, showing alternative stowage provisions.

FIG. 6 illustrates one embodiment of an overhead rest accommodation, incorporated in a centerline module of an aircraft, but in this case module 61 has stowage compartments 62 and a short closet 64, rather than a galley cart area. A ladder 65 leads to a landing 66 and a sleeping compartment 67.

Figure 7:
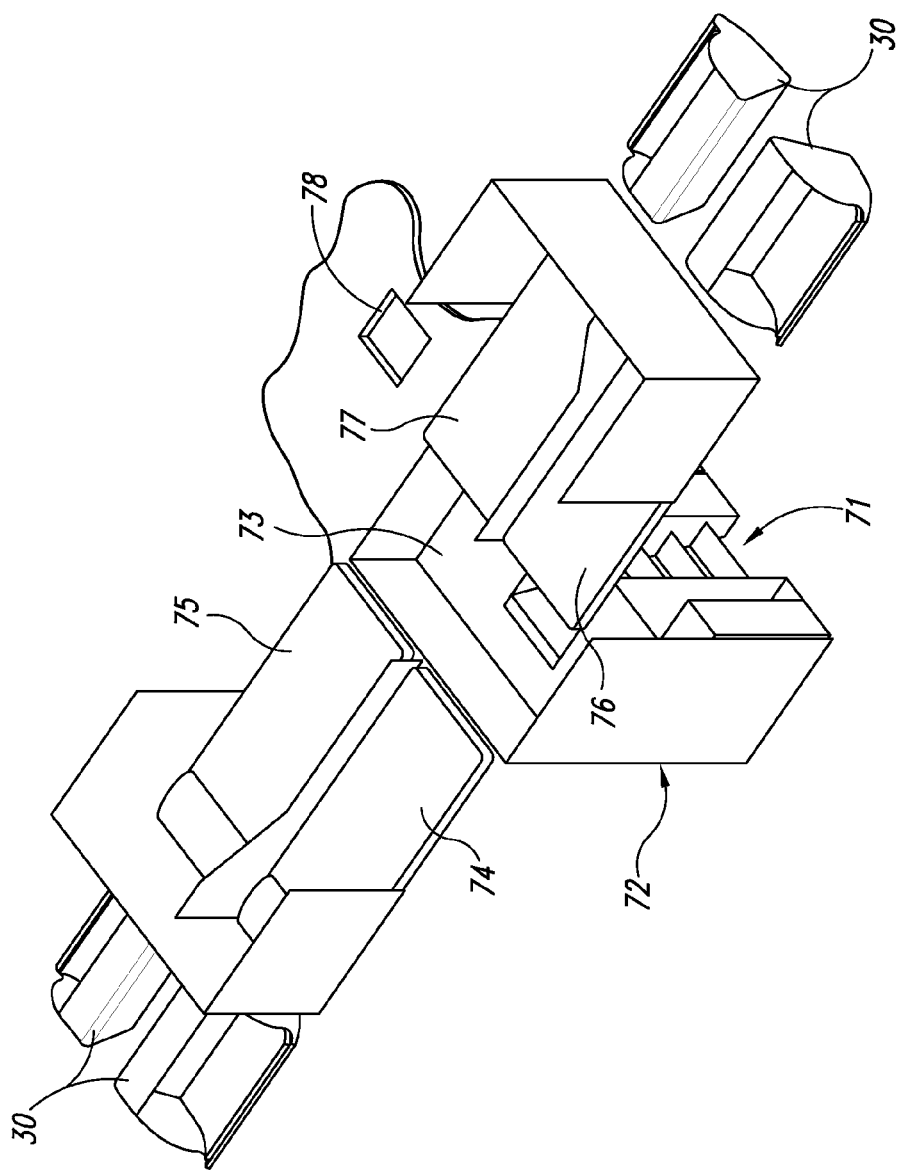
FIG. 7 is a diagrammatic perspective of an alternative form of overhead rest accommodation for aircraft using longitudinally extending bunk units that do not extend transversely beyond the center cabin overhead bins.

The embodiment shown in FIG. 7 also uses a steep stairway or ladder 71 totally confined within an existing center line module 72 and leading to a landing 73 for access to overhead bunks. In this embodiment, however, two bunks 74 and 75 extend forward from the aperture and two bunks 76 and 77 extend aft. Each set of side by side bunks is confined to overhead stowage space only. The lower ceiling is limited to the space directly above the module work space. In this embodiment the use of a passenger exit cross aisle coinciding with the interior module workspace serves both functions whilst minimally affecting main deck passenger seating. This proximity to the passenger exit door provides a direct escape path via the emergency escape hatch (78). In the cabin area, the profile of the overhead stowage bins and ceiling is retained, although a few bins must be deleted to accommodate the bunks. Nevertheless, as in the previously described embodiments, the landing 73 is contained solely within the module area, and is lowered relative to the bunks. Each bunk is accessible from the landing area at the top of the stairway/ladder. Further, the alterations required for the aircraft are not so great as to make retrofitting of the overhead rest accommodation impractical, and revenue generating areas are not affected.

Figure 8:
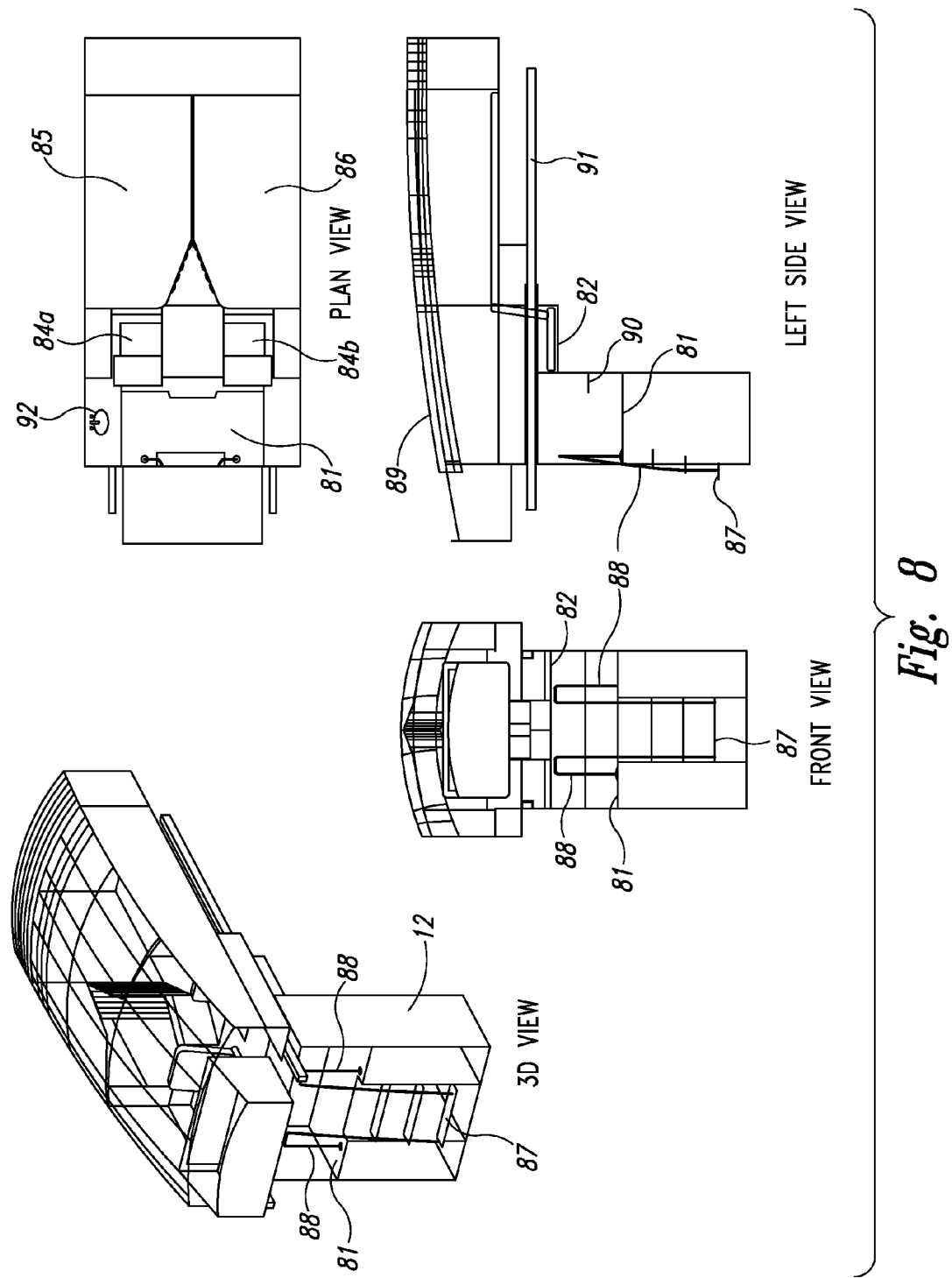
FIG. 8 is a diagrammatic with four views illustrating front, side top and perspective view to depict the aspect of the proposed invention that provides an intermediate space, or vestibule chamber, with seats adjacent to two crew rest bunks.

In another configuration shown in FIG. 8, the accommodation contains a primary landing (81) and a higher, elevated secondary landing (82) within the same chamber or vestibule. This embodiment utilizes an intermediate platform to serve as a base for the seats (84a, 84b) facing into the vestibule area and provides an entryway into the bunks (85) and (86) directly behind the seats. The ladder (87) to the landing (81) provides the handrails (88) to facilitate access. This embodiment provides a concept that accommodates the inward and downward tapered fuselage sections typical of the forward passenger cabin in subsonic commercial transport jet aircraft. Moderate curvature of the fuselage crown is shown in perspective view and depicted by the sloping buttock lines (89) shown in the upper region of the rest accommodation. An additional step (90) is depicted to aid access to the secondary landing (82). Access to the bunks (85, 86) is provided upon ascending the upper landing. The centerline stowage bin support rail (91) is not interrupted in this embodiment of the invention. The vestibule chamber serves as a changing space with sink (92) and related amenities within the chamber. In this embodiment, it may be necessary to lower the ceiling of the passenger cabin at the position directly below the secondary landing.

Figure 9:
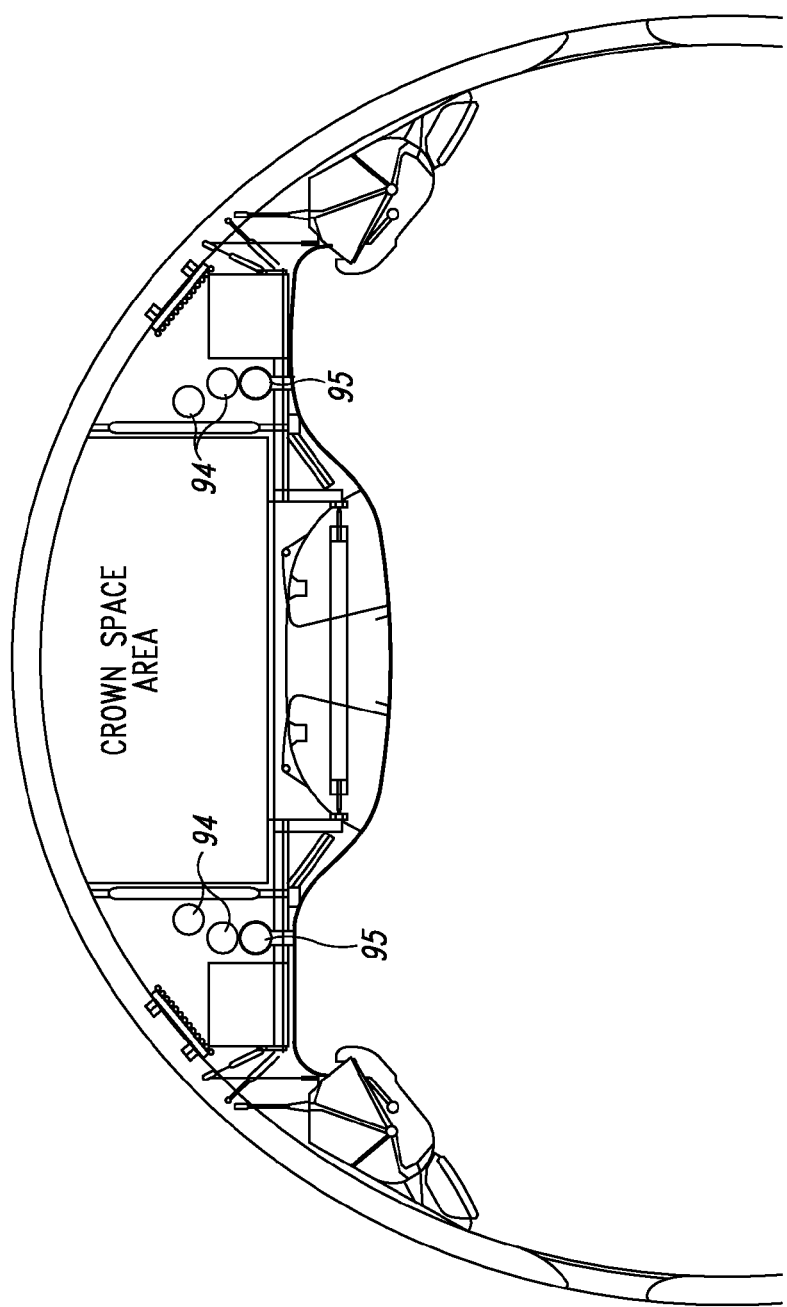
FIG. 9 is a diagrammatic providing four views previously described in FIG. 8, however, in this view an alternative use of the main deck, centerline module shows the use of cabinets for a video control center (VCC) below the landing and shows a separate purser station situated inside the vestibule chamber.

For this same configuration FIG. 9 shows the crown space available for crew bunks without lowering the stowage bins for the Boeing 777™. In this configuration the rerouted environmental control system air ducts (94) are shown nested above the existing ceiling plenum duct (95). This configuration, with a more restricted space for the bunks, provides sufficient space to comply with the bunk headroom requirement while not lowering the stowage bins below the bunks.

Figure 10:
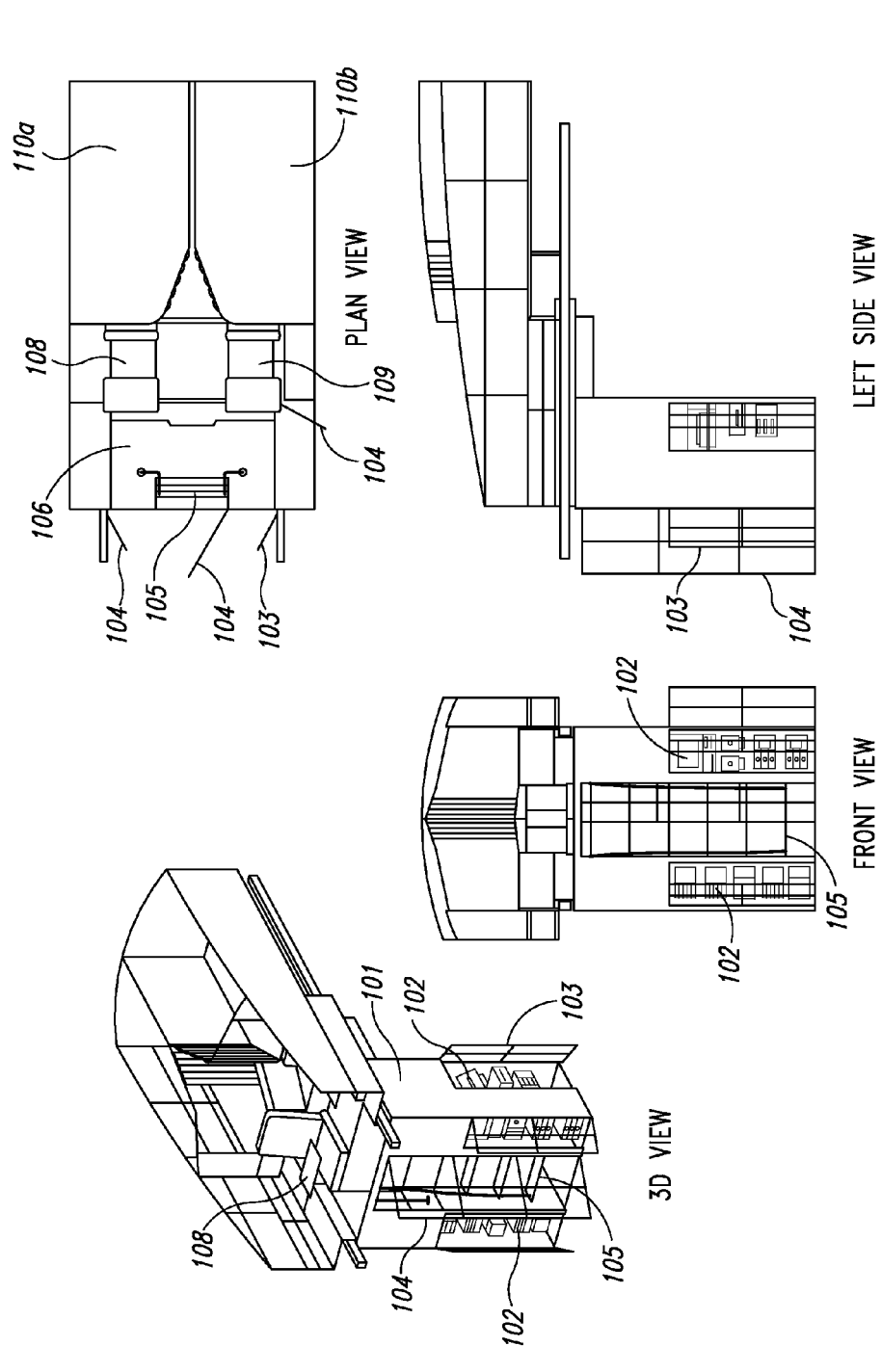
FIG. 10 is a diagrammatic of another concept showing an open crown area that provides sufficient clearances for bunks whilst maintaining the use of the stowage bins directly below for main deck passengers.

In another embodiment, FIG. 10, the alternative usage of the main deck module (101) for a video control center cabinet (VCC) with video system (102) is depicted. VCC cabinet security doors (103) and main vestibule entry doors (104) provide lockable, secure spaces. A ladder 105 provides access to the landing 106 and a secondary landing 107 having two purser work stations 108, 109 and two bunks 110a, 110b. The interior module's internal vestibule chamber provides a purser work station work area, and, in so doing, does not encumber main deck passenger seating that would otherwise be allocated to a main deck purser station.

Figure 11:
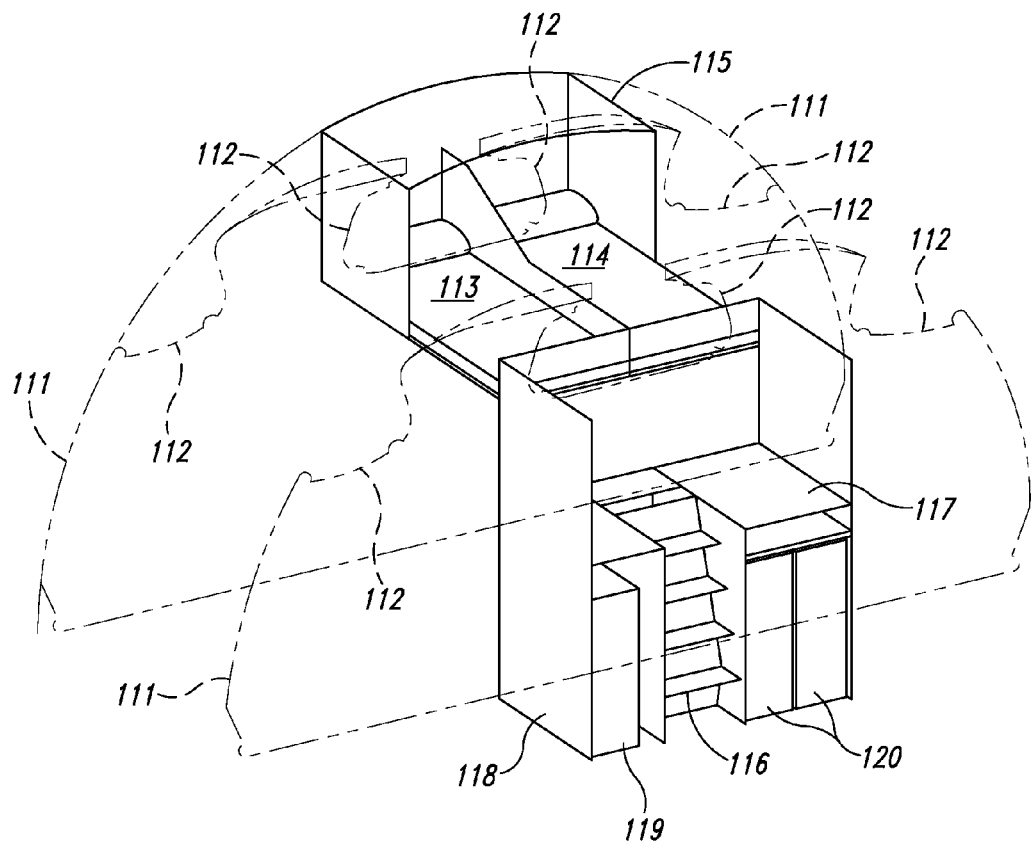
FIG. 11 is a diagrammatic that envisages the main deck cabin module previously described in FIGS. 1-6, an enlarged stowage bin bustle architecture with external dimensions extending further outboard than the boundaries of the existing stowage bins shown in outline.

Subsonic commercial aircraft having a relatively small diameter fuselage and cross-section as shown in FIG. 11 may be accommodated by a similar design. The concept shows in outline the fuselage frame (111) lines and stowage bin external lines (112). The envelope of the bunks (113) and (114) exceed the external dimensions of the stowage bins (112) in this embodiment. In this view a stowage bin bustle (115) would enclose the overhead crew bunk space. A ladder 116 leads to a platform 117 inside a passenger cabin module 118 having additional stowage space 119, 120 for galley carts or other items, on the passenger cabin deck.

Figure 12:
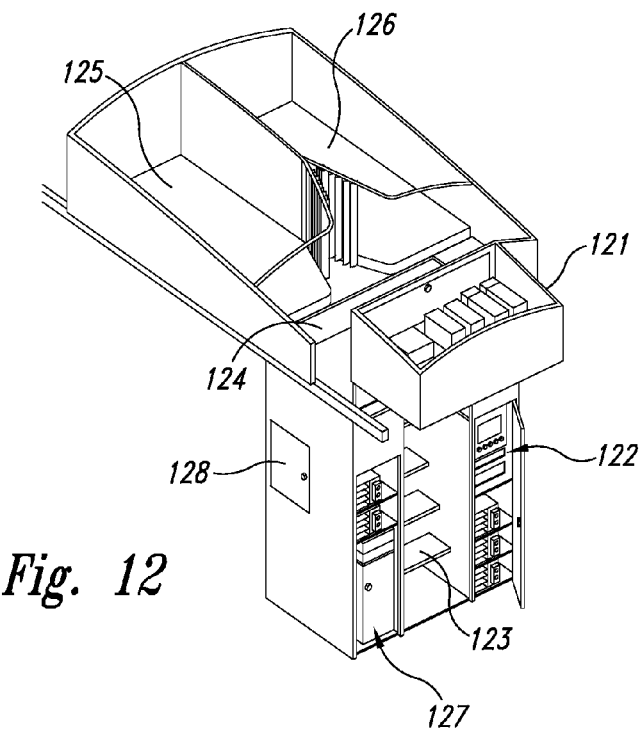
FIG. 12 includes a diagrammatic depicting an overhead purser station work area, FIG. 13 provides a diagrammatic of a purser station work area with an alternate orientation for the main deck module ladder and landing.
Figure 13:
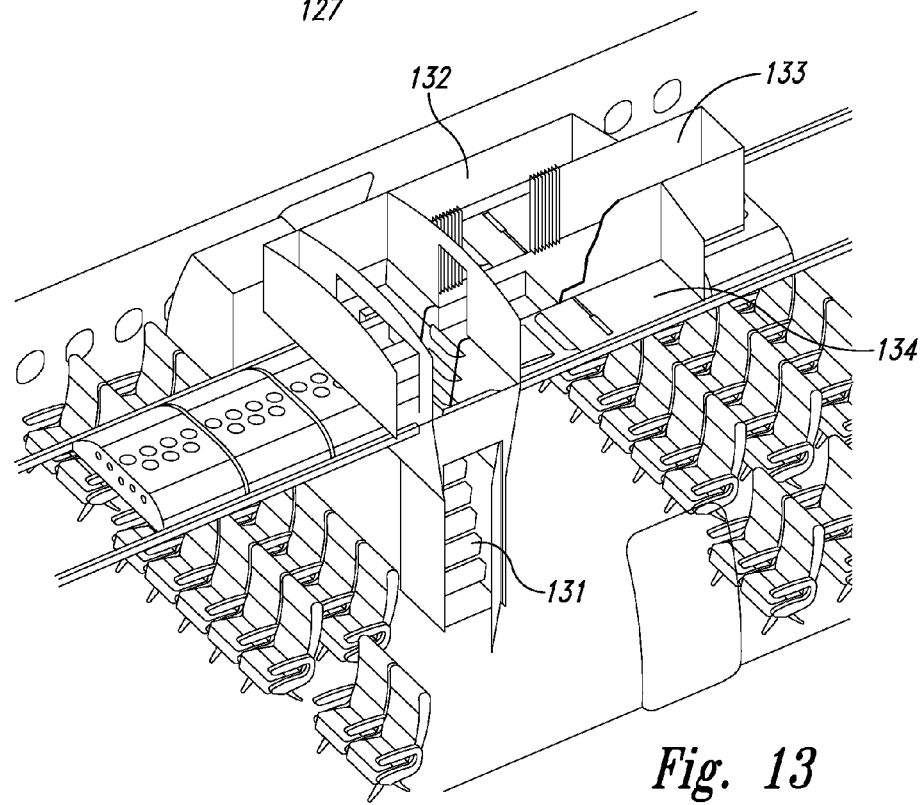

FIG. 12 shows an embodiment that incorporates a stowage space 121 for electronic equipment in the compartment. The electronic equipment is connected to a purser station 122 in the lower portion of the passenger cabin module. The passenger cabin module has a middle stairway 123 that leads to a landing 124 and a compartment. The compartment has two bunks 125 and 126 as sleeping accommodations for crewmembers. Additional stowage space 127 and 128 in the passenger cabin module accommodates galley carts or other items. FIG. 13 is an alternate view of a rest accommodation similar to that shown in FIG. 12 that also shows the layout of the passenger cabin seating and overhead stowage bins in the vicinity of the rest accommodation. In this embodiment, the stairway 131 leading to the compartment has its entry on a different side of the module, and the compartment has three bunks 132, 133, and 134. In either of these embodiments, the compartment may have a height which requires that the stowage bins be eliminated or reduced in size, so that the compartment occupies a portion of the passenger cabin ceiling space that would otherwise be occupied by the stowage bins.

While the preferred embodiment of the invention has been illustrated and described, it will be appreciated that various changes can be made therein without departing from the spirit and scope of the invention.

The invention claimed is:

1. A passenger cabin module for an aircraft having a passenger cabin with a ceiling and a crown space above the ceiling, comprising:

a compartment in the crown space having a compartment floor on which at least one bunk is positioned;

an aperture in the compartment floor connecting the compartment to the passenger cabin;

a landing positioned inside the passenger cabin module, directly below at least a portion of the aperture in the compartment floor and vertically separated from the compartment floor by a plurality of walls, with the compartment floor adjacent to at least two walls of the landing; and stairs or a ladder leading from the landing to a floor of the passenger cabin.

2. The passenger cabin module of claim 1, wherein the landing has an area of at least 12 square feet.

3. The passenger cabin module of claim 1, wherein the landing has an area of at least 15 square feet.

4. The passenger cabin module of claim 1, wherein the aircraft is a twin aisle aircraft having port, center and starboard seat groups in the passenger cabin, with the compartment positioned in the crown space of an aircraft above the ceiling of the center seat group.

5. The passenger cabin module of claim 4, wherein the landing has an area of at least 12 square feet.

6. The passenger cabin module of claim 4, wherein the landing has an area of at least 15 square feet.

7. The passenger cabin module of claim 1, that additionally comprises a stowage space for electronic equipment in the compartment.

8. The passenger cabin module of claim 1, wherein the crown space has a height of no more than 4 feet.

9. The passenger cabin module of claim 1, wherein the crown space has a height of no more than 3 feet.

10. The passenger cabin module of claim 1, wherein the compartment has a minimum floor area of at least 15 square feet.

11. The passenger cabin module of claim 1, wherein the aperture has a minimum width or diameter of at least 28 inches.

12. The passenger cabin module of claim 1, wherein the landing has a minimum area of at least 6 square feet, and is positioned no more than 36 inches below the compartment floor, and at least 54 inches below a crown of a fuselage of the aircraft.

\* \* \* \* \*